No. 718,262.　　　　　　　　　　　　　　　　　　　　PATENTED JAN. 13, 1903.
J. J. LEAHY & A. PARMITER.
BELT SHIFTER.
APPLICATION FILED JAN. 21, 1902.
NO MODEL.　　　　　　　　　　　　　　　　　　　　　　　　　　2 SHEETS—SHEET 1.
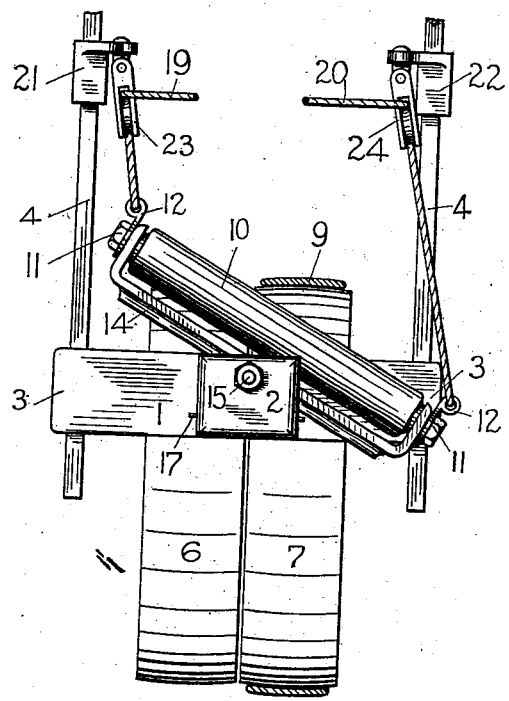
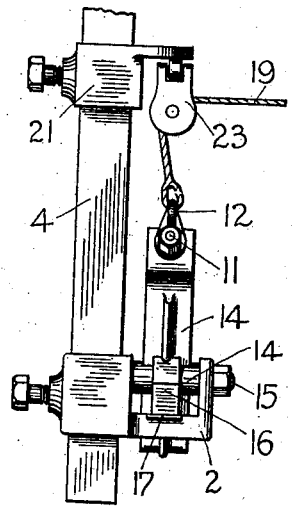
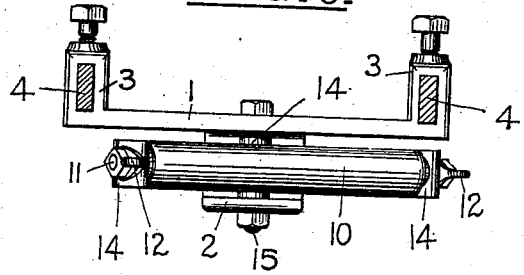
Witnesses
Leonard E. Haynes.
Inventors
John Joseph Leahy &
Arthur Parmiter
By Herbert Sefton Jones
Attorney.

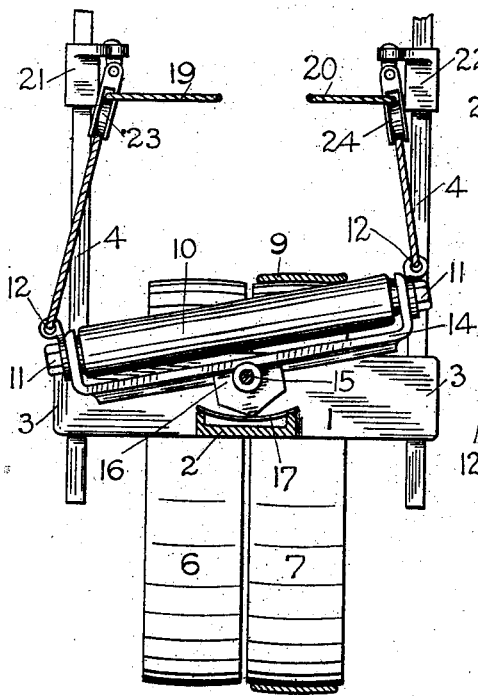
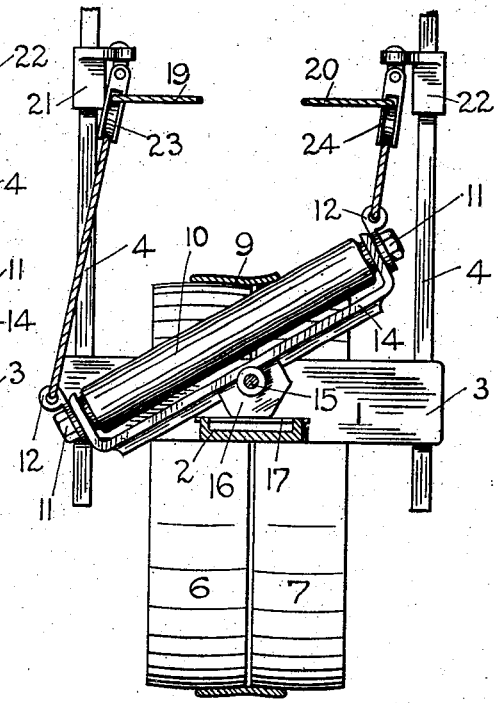
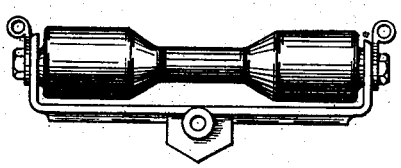

UNITED STATES PATENT OFFICE.

JOHN JOSEPH LEAHY, OF NORTH ADELAIDE, AND ARTHUR PARMITER, OF ADELAIDE, SOUTH AUSTRALIA, AUSTRALIA.

BELT-SHIFTER.

SPECIFICATION forming part of Letters Patent No. 718,262, dated January 13, 1903.

Application filed January 21, 1902. Serial No. 90,683. (No model.)

*To all whom it may concern:*

Be it known that we, JOHN JOSEPH LEAHY, contractor, a resident of No. 106 Barnard street, North Adelaide, and ARTHUR PARMITER, carpenter, a resident of No. 5 Selby street, Adelaide, in the State of South Australia, Commonwealth of Australia, subjects of the King of Great Britain and Ireland, have invented certain new and useful Improvements in Belt-Shifters, of which the following is a specification.

Various methods have been devised for transferring belts from one pulley to another, such as from fast to loose pulleys, or vice versa; but they very often cause great damage to the edges of the belts or require the exercise of considerable power to transfer from one pulley to the other.

This invention provides a simple and inexpensive means for effecting the required transfer without damaging the belt in any way.

The invention consists in providing adjacent to the pulleys an adjustable roller between the two parts of the belt, such roller having its axis working in a plane substantially perpendicular to the face of the belt and being so supported that it is normally out of contact with the belt, but capable of being brought into contact with the inner face thereof when it is desired to transfer the belt from one pulley to another. To transfer the belt from one pulley to the other, that end of the roller to which the belt is adjacent is moved outward, tending to lift the belt from the pulley and extend its path of travel, whereupon the belt as it travels onward moves down the inclined roller toward the other end thereof and on to the second pulley to a shorter path of travel.

To prevent the belt accidentally creeping from one pulley to the other, the rocking carrier which carries the roller is provided with a cam or projection bearing upon a spring, so that when the roller has been inclined either way it is retained by the spring in that position until it is again operated to transfer the belt.

In order that our invention may be clearly understood, we will describe the same with reference to the accompanying drawings, in which we have shown the invention applied to a horizontally-traveling belt approaching the pulleys on the top and leaving them from the bottom.

Figure 1 is a front view of our belt-transfer appliance. Fig. 2 is a side view of the same. Fig. 3 is a plan of the same, but with the operating-cords and their pulleys omitted. Figs. 4 and 5 are front views showing the appliance in different positions. The front of the frame-box 2 is removed in these figures to show the spring 17. Fig. 4 shows the position occupied by the parts at the commencement of a transfer. Fig. 5 shows the position occupied by them when the transfer is almost completed. Fig. 6 shows a modified form of roller which is especially suitable when a rapid transfer of the belt is required.

The several moving or operative parts are mounted upon or attached to a frame consisting of a bar 1, having in the center a pivot-box 2 and at each end a socket 3. Each socket 3 has a clamping set-screw, whereby it is secured in the desired position to a suitable support 4. At the front of this bar is a roller 10, mounted on a spindle 11, the ends of which are held in the ends of the rocking carrier 14, which is centrally pivoted upon a pin 15, passing through the two sides of a box 2 at the middle of the frame-bar 1. Projecting from the bottom of the rocking carrier 14 is a cam or projection 16, which impinges upon a flat spring 17, supported near the bottom of the box 2. At the ends of the rocking carrier 14 are eyepieces 12, secured upon the spindle 11, to which are attached operating-cords 19 and 20, whereby the carrier is rocked as desired. From the eyepieces 12 the operating-cords 19 and 20 are passed over lazy-pulleys 23 and 24 and are led thence over further pulleys, if necessary, to some position convenient to the operator. The pulleys 23 and 24 are swiveled to blocks 21 and 22, which are capable of being moved up or down the supports 4 and are secured at the desired height thereon by clamping set-screws. The roller 10 is formed, preferably, of a length of brass tube fitted with an iron plug at each end, which is bored to fit the spindle 11. When not in operation, the roller 10 lies just adjacent to but out of contact with the inner face of the belt 9.

In Figs. 1, 4, and 5 the pulleys 6 and 7 are shown behind the belt-shifting appliance, the one part of the belt 9 being just above the roller and the return part beneath the bottom of the frame—that is to say, the roller 10 is arranged to swing between the running-over and running-under portions of the belt, or, in other words, between those portions of the belt which run over and under the pulleys on which the belt may be traveling at the time.

Assuming the parts to be in the position shown in Fig. 1 and it is desired to transfer the belt 9 from pulley 7 to pulley 6, the action is as follows:

On pulling the cord 20 the carrier 14, with the roller 10, is rocked upon the pin 15, bringing the roller into contact with the under side of the belt 9, as shown in Fig. 4, the immediate effect of which is to extend the path of travel of the belt, and it at once moves down the inclined roller from the raised end toward the depressed end thereof. As the inclination of the roller is increased to the position shown in Fig. 5 the transfer of the belt is accelerated until it has passed off the roller and onto the pulley 6 as desired. As the end of the carrier is depressed the central point of the cam or projection 16 moves downward, bending the spring 17 until the roller 10 reaches a horizontal position. After the point of the cam has passed this point the spring assists the operator, throwing the end of the carrier upward and holding it there until it is depressed by means of the cord 19 in order to transfer the belt back to pulley 7.

When it is desired to transfer the belt from the pulley 6 to the pulley 7, the cord 19 is pulled, the roller and carrier are rocked, and a corresponding, but reverse, action takes place.

We have shown the appliance as adapted to a horizontally-traveling belt which approaches the pulleys on the top. In applying it to belts moving in other directions the appliance will require to be supported in a corresponding position relative to the belt. In the case of a horizontally-traveling belt approaching the pulleys on the under side no alteration will be required to any part; but the whole appliance will be secured on the supports in a reversed position—that is, with the pivot-box over the roller, which will be just above the inner face of the bottom part of the belt. The eyepieces will be rotated on the spindle and the operating-cords passed over the lazy-pulleys, as before; or the blocks carrying the lazy-pulleys may be secured to the supports below the frame-bar.

In place of the cords for operating the roller we may employ a lever with suitable connections to the rocking carrier. This would be particularly applicable to rollers for transferring heavy belts or for rollers situated in confined spaces beneath the floor.

Having now particularly described and ascertained the nature of our said invention and in what manner the same is to be performed, we declare that what we claim is—

1. A belt-shifter comprising a roller adapted to swing between the running-over and running-under portions of the belt so as to impinge upon one or the other edge of said belt when swung in one or the other direction, for the purpose set forth.

2. A belt-shifter comprising a roller, a fixed pivot on which said roller is adapted to swing perpendicular to its longitudinal axis between the running-over and running-under portions of the belt so as to impinge upon one or the other edge of said belt when swung in one or the other direction, for the purpose set forth.

3. A belt-shifter comprising a roller, a fixed pivot on which said roller is adapted to swing perpendicular to its longitudinal axis between the running-over and running-under portions of the belt so as to impinge upon one or the other edge of said belt when swung in one or the other direction, in combination with means for positioning the roller out of the line of travel of the belt, for the purpose set forth.

4. A belt-shifter comprising a roller, a fixed pivot on which said roller is adapted to swing perpendicular to its longitudinal axis between the running-over and running-under portions of the belt so as to impinge upon one or the other edge of said belt when swung in one or the other direction, in combination with a yielding stop holding the roller out of the line of travel of the belt, for the purpose set forth.

5. A belt-shifter comprising a carrier, a roller journaled therein, a fixed pivot on which said carrier is adapted to rock between the running-over and running-under portions of the belt to cause the roller to act upon one or the other edge of said belt when swung in one or the other direction, means for positioning the roller out of the line of travel of the belt and means for rocking the carrier, for the purpose set forth.

6. In a belt-shifter, a rockable carrier, a spindle held in the ends of the same, a roller mounted upon said spindle, means for supporting said rockable carrier comprising a stationary bar having sockets in its ends, a box centrally situated upon the same, and a pivot-pin held in said box, supports affixed to said sockets, means for operating said rockable carrier comprising operating-cords, a spring supported in said box, and a cam on the under side of said rockable carrier.

7. A belt-shifter comprising a stationary frame, a rockable carrier centrally pivoted in the same, a spindle held by said rockable carrier, a roller mounted upon said spindle, the roller being normally adjacent to and clear of the inner face of the belt, and operating-cords adapted to rock said rockable carrier to lift the belt from its under side and thereby transfer the same from one pulley to the other.

8. In a belt-shifter, the combination of the stationary frame 1, supports 4, central box 2, pivot-pin 15 and a spring 17 supported in said box 2; the rockable carrier 14 pivoted upon said pin 15, a cam on the under side of said rockable carrier impinging upon said spring 17 and operating-cords 19 and 20; the spindle 11 held in the ends of said rockable carrier and the roller 10 supported on said spindle.

In testimony that we claim the foregoing as our invention we have signed our names, in the presence of two witnesses, this 29th day of May, 1901.

JOHN JOSEPH LEAHY.
ARTHUR PARMITER.

Witnesses:
CHARLES NICHOLAS COLLISON,
ARTHUR GORE COLLISON.